United States Patent [19]
Guccione

[11] Patent Number: 6,074,432
[45] Date of Patent: Jun. 13, 2000

[54] METHOD FOR GENERATING A SOFTWARE CLASS COMPATIBLE WITH TWO OR MORE INTERPRETERS

[75] Inventor: Steven A. Guccione, San Jose, Calif.

[73] Assignee: Xilinx, Inc., San Jose, Calif.

[21] Appl. No.: 09/044,496

[22] Filed: Mar. 19, 1998

[51] Int. Cl.[7] .................................................. G06F 9/45
[52] U.S. Cl. .................... 717/2; 717/1; 717/5; 703/27
[58] Field of Search .................... 395/701–703, 395/705, 500.43, 500.47, 500.48; 709/302, 303, 305; 717/1, 2, 3, 5; 703/23, 26, 27

[56] References Cited

U.S. PATENT DOCUMENTS

| | | | |
|---|---|---|---|
| 5,708,811 | 1/1998 | Arendt et al. | 395/712 |
| 5,734,904 | 3/1998 | Kanamori et al. | 709/305 |
| 5,822,591 | 10/1998 | Hochmuth | 395/705 |
| 5,901,315 | 5/1999 | Edwards et al. | 395/704 |

OTHER PUBLICATIONS

David Boydston, "Re: native interface" May 20, 1997, USENET, Newsgroup: asymetrix.supercede 'Online!, RetrievedfromInternetvia<URL:http://jcentral.alphaworks.ibm.com/search/cgi–bin/AllFullhit.pl?CiWebhitsFile=887740554645.html&Type=News&HitRestriction=JNI%20AND%20RNI>, Apr. 27, 1999.

Solutions Consulting: "SerialPort: Access Serial Ports with Java" 'Online! Retrieved from the Internet: <URL: http://www.sc–systems.com/serPort.html> Apr. 27, 1999.

Microsoft Corporation: "Mixing Java and Native Code", 'Online! Retrieved from the Internet: <URL:http://www.microsoft.com/java/sdk/20/jnative/defa0000.htm>, Apr. 27, 1999.

Wilson A: "The Java native Method Interface and Windows", Dr. Dobb's Journal, Aug. 1997, Miller Freeman, USA, vol. 22, No. 8, pp. 46, 48–50 and 94.

"Platform Abstraction of Input Method Using Proxy Server", IBM Technical Disclosure Bulletin, vol. 40, No. 4., Apr. 1997, pp. 83–84.

Maruyama et al., "A new class generation mechanism by method integration", Proceedings, Software Reuse, IEEE, 1998, pp 196–205.

*Primary Examiner*—Kakali Chaki
*Attorney, Agent, or Firm*—Lois D. Cartier; Julie Stephenson, Esq.; Bever, Hoffman & Harms

[57] ABSTRACT

The invention provides a technique for generating a portable software class that includes native methods, i.e., a software class compatible with interpreters conforming to two or more different interfaces. Therefore, the method of the invention allows the development of code that simultaneously supports two or more native method interfaces. The portable software class references a plurality of interface libraries, each of which interfaces to native methods included in the class. While in any given situation all but one of the interface libraries are unused, the overhead of carrying these extra libraries is minimal. The interface libraries are preferably generated from a shared piece of user-generated code. According to another embodiment of the invention, a separate version of the user-generated interface code is generated for each interface library.

16 Claims, 4 Drawing Sheets

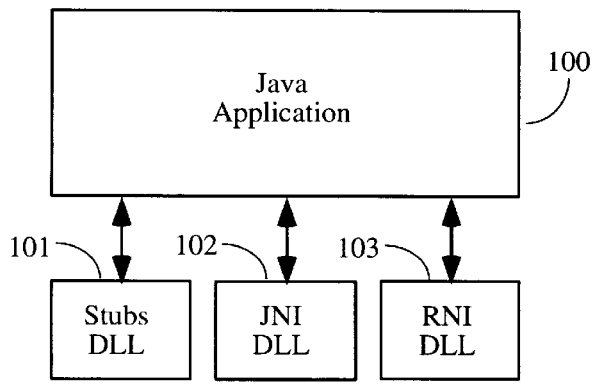

FIG. 1

```
201  public class MyClass {
        public native int printNum(int num);

static {
           try {
              System.loadLibrary("MyClassStubs");
              System.loadLibrary("MyClassJNI");
              System.loadLibrary("MyClassRNI");
           } catch (UnsatisfiedLinkError ule) {
202          System.err.println("Unsatisfied Link Exception: Could not load library.");
              System.exit(-1);
           } /* end try{}*/
        } /* end static() */ public static void main(String  argv[])   {
           int i;
           int result;
           MyClass pn = new MyClass();
203
           for (i=0; i<10; i++)
              result = pn.printNum(i);

} /* end main() */

}; /* end class MyClass */
```

FIG. 2

```
C:\> javah -o MyClass_stubs.h MyClass
C:\> javah -stubs -o MyClass_stubs.c MyClass
```

FIG. 4

```
long
printNum(long num) {
   printf("%d", num);
   return (num);
   }  /* end printNum() */
```

FIG. 5

```
long
MyClass_printNum(struct HMyClass *h, long num) { return (printNum(num));

}  /* end MyClass_printNum() */
```

FIG. 6

```
C:\> java MyClass
0123456789
C:\>
```

FIG. 7

```
C:\> javah -jni -o MyClassJNI.h MyClass
```

FIG. 8

```
JNIEXPORT jint JNICALL
Java_MyClass_printNum(JNIEnv *env, jobject obj, jint num) { return ((jint) printNum(num));

} /* end Java_MyClass_printNum() */
```

FIG. 9

```
C:\> msjavah -o MyClassRNI.h MyClass
```

FIG. 10

```
__declspec(dllexport) long __cdecl
MyClass_printNum(struct HMyClass *h, long num) { return (printNum(num));

} /* end MyClass_printNum() */
```

FIG. 11

METHOD FOR GENERATING A SOFTWARE CLASS COMPATIBLE WITH TWO OR MORE INTERPRETERS

BACKGROUND OF THE INVENTION

1. Field of the Invention

The invention relates to computer software used to interface Java™ code to hardware or non-Java code. ("Java" is a trademark of Sun Microsystems, Inc.) More particularly, the invention relates to a method for generating interface software compatible with two or more Java interpreters.

2. Description of the Background Art

The Java programming language was developed in the early 1990's at Sun Microsystems, Inc., of Palo Alto, Calif. The goal was to provide a portable development environment for embedded systems. (An embedded system is a special-purpose computer-controlled system, such as a microprocessor controlling a microwave oven.) The plan was to provide a "Write Once, Run Anywhere" programming language, so that developers of embedded systems would not be tied to any particular CPU architecture.

The Java concept was developed and marketed to the embedded systems market, without great success. However, in the mid-1990's, the internet ("Web") underwent a period of explosive growth. (The terms "internet" and "Web" as used herein refer to a wide area data communications network, typically accessible by any user having appropriate software.) For the first time, people with various incompatible systems could access information remotely in a standard format. Web pages looked the same whether accessed from a workstation, PC, or Macintosh computer.

The next step was to provide more active content for Web pages, to provide more visual interest and to allow users to interact with the Web pages. Some sort of programming language support was clearly necessary. However, the language would have to be portable, i.e., it would have to execute on a variety of diverse computers using a variety of operating systems.

Java was the solution waiting in the wings for active content for the Web. Java was quickly embraced and introduced to literally millions of programmers. While much of the use of Java is for applets (i.e., small Java programs used by Web browsers) to enhance Web pages, Java is still a portable, general-purpose object-oriented programming language. Many programmers have traded in their C and C++ compilers for Java. However, compatibility issues have arisen relating to interfacing Java code to hardware or non-Java code.

Java, as the language is defined, is hardware independent. While this independence is a great benefit to most Java users, Java provides no mechanism for interfacing to an external device (typically either hardware or non-Java code). Unfortunately, in many instances, particularly in embedded design, it is necessary to communicate with device drivers, C or C++ libraries, or even the hardware itself.

Since Java is a hardware independent programming language, there must be a hardware dependent interface for each computer platform that will run the Java code. Commands such as "printer" and "write to disk" that make specific use of the hardware are handled through a platform-specific interpreter. To access non-standard hardware, or to access standard hardware in non-standard ways, native methods are used. Therefore, the current technique for communicating with hardware or non-Java software outside the standard functions provided by the interpreter is the native method. A "method" is a function or procedure. (The term "method" is also used herein in its traditional meaning of a series of steps performed to achieve a desired result.) A "native method" is a method that is platform dependent. To define a native method in Java, a method in a class is given the prefix "native". Java provides no implementation for native methods, but does supply a mechanism called a "native interface" for interfacing a native function definition to other code. The term "class" means a collection of data and methods that operate on the data. (Although the terms defined above are often used with reference to Java, the use of these terms herein is not intended to be restricted to Java.)

Sun Microsystems, Inc. supplied a first native interface in its version 1.0 Java Development Kit. The Sun 1.0 interface uses a technique involving "stubs"; therefore, this version is referred to herein as the Stubs interface. In version 1.1 of the Java Development Kit, Sun Microsystems, Inc. defined a second native interface called the Java Native Interface, or JNI. Finally, Microsoft Corporation has defined a third native interface for Java, known as Raw Native Interface, or RNI. The interpreters corresponding to these interfaces (Stubs, JNI, and RNI) are referred to herein as the Sun 1.0 interpreter, the Sun 1.1 interpreter, and the Microsoft Java interpreter, respectively.

The three interfaces are incompatible. As a consequence, when writing Java code using native methods a choice must be made whether to be compatible with the Stubs, JNI, or RNI interface. With this choice made, users of the code must also have the corresponding Java interpreter in order to execute the code. Clearly, this lack of standardization has adversely impacted the portability of Java. Since Java code is expressly designed for easy portability, it is desirable to provide a method for generating interface software compatible with two or more interpreters.

SUMMARY OF THE INVENTION

The invention provides a technique for generating a portable software class that includes native methods, i.e., a software class compatible with interpreters conforming to two or more different interfaces. Therefore, the method of the invention allows the development of code that simultaneously supports two or more native method interfaces. The portable software class references a plurality of interface libraries, each of which interfaces to native methods included in the class. While in any given situation all but one of the interface libraries are unused, the overhead of carrying these extra libraries is minimal.

The interface libraries are preferably generated from a shared piece of user-generated interface code. According to another embodiment of the invention, a separate version of the user-generated interface code is generated for each interface library.

In one embodiment of the invention, a software class is generated that is compatible with all of the Sun 1.0, Sun 1.1, and Microsoft Java interpreters.

BRIEF DESCRIPTION OF THE DRAWINGS

The present invention is illustrated by way of example, and not by way of limitation, in the following figures.

FIG. 1 is a block diagram of one embodiment of the invention, in which three different interfaces are supported for a single Java application.

FIG. 2 shows exemplary Java code for a class called MyClass( ) that includes native method printNum( ).

FIG. 4 shows the commands used to generate header and stubs files for class MyClass( ), in accordance with the design flow of FIG. 3.

FIG. 5 shows user-generated interface code comprising a platform-independent C version of the Java printNum( ) native method.

FIG. 6 shows the user C code providing the implemented function of FIG. 5 to the Stubs interface.

FIG. 7 shows the command used to execute the Java class of FIG. 2 using the Sun 1.0 interpreter, and the resulting output.

FIG. 8 shows the Javah command used to generate the JNI header file for class MyClass( ), in accordance with the design flow of FIG. 3.

FIG. 9 shows the user C code providing the implemented function of FIG. 5 to the JNI interface.

FIG. 10 shows the Msjavah command used to generate the RNI header file for class MyClass( ), in accordance with the design flow of FIG. 3.

FIG. 11 shows the user C code providing the implemented function of FIG. 5 to the RNI interface.

DETAILED DESCRIPTION OF THE DRAWINGS

Figure 3:
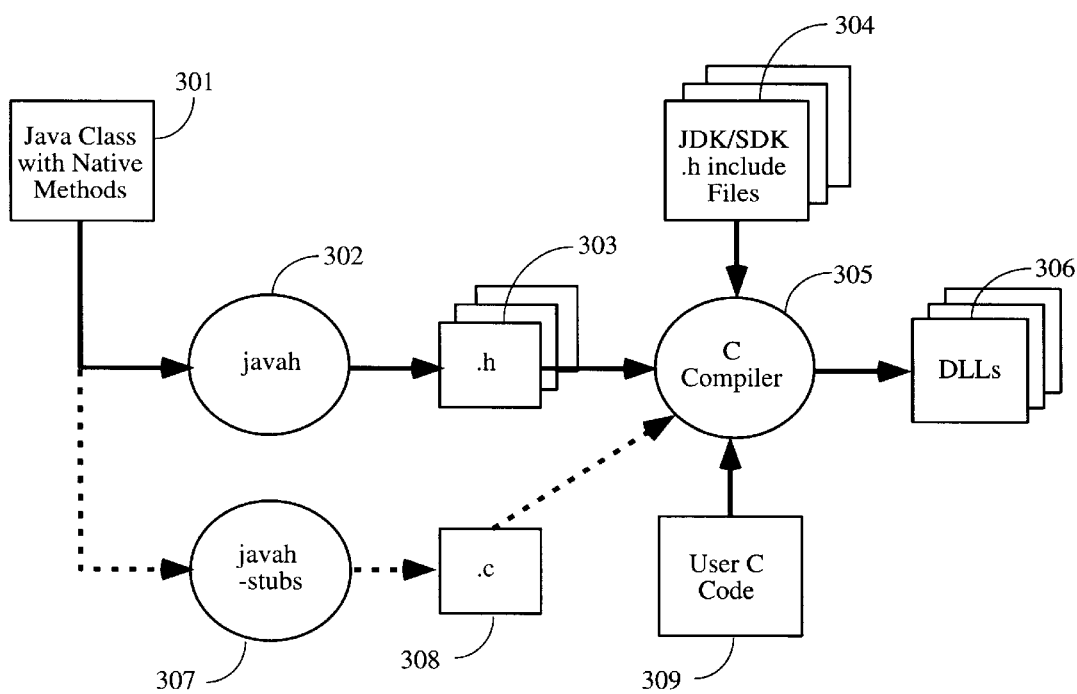
FIG. 3 shows the design flow used to build dynamically linked libraries (DLLs) to be referenced by a class such as the MyClass( ) class of FIG. 2.

A method for generating interface software compatible with two or more different interpreters is described. In the following description, numerous specific details are set forth in order to provide a more thorough understanding of the present invention. However, it will be apparent to one skilled in the art that the present invention may be practiced without these specific details. In other instances, well-known features have not been described in detail, in order to avoid obscuring the present invention.

The computer code devices (e.g., methods, classes, libraries) referenced herein may be stored on a data storage medium. (The term "data storage medium" as used herein denotes all computer-readable media such as compact disks, hard disks, floppy disks, tape, magneto-optical disks, PROMs (EPROM, EEPROM, Flash EPROM, etc.), DRAMs, SRAMs, and so forth.)

FIG. 1 is a high-level diagram showing the method of the invention for supporting different interfaces by interfacing a class with two or more native interface libraries (in this example, three dynamically linked libraries, or DLLs). In FIG. 1, Java application 100 has three available DLLs (101, 102, 103) providing native method support to Stubs, JNI, and RNI interfaces, respectively. Procedures for generating the DLLs are described below with reference to FIGS. 3–9.

FIG. 2 shows an exemplary Java class that supports the Stubs, JNI, and RNI native interfaces. The simple Java class in FIG. 2 comprises a class called MyClass( ). The MyClass( ) class is designed to be included in one or more Java applications such as the Java application represented by block 100 in FIG. 1.

The MyClass( ) class of FIG. 2 includes a native method 201, a static section 202, and a main method 203. (In some embodiments of the invention, the main method is not included in the class.) The native method printNum( ) 201 simply prints an integer. Main method 203 uses native method 201 to print an integer of the first ten digits, producing the output "0123456789". Static section 202 is used to load the external libraries (101, 102, and 103 in FIG. 1). In this embodiment, it is static section 202 that makes the MyClass( ) class portable.

In this embodiment of the invention, three interface libraries are provided. The three interface libraries are MyClassStubs.dll, MyClassJNI.dll, and MyClassRNI.dll, one for each supported interface. These libraries correspond to the Stubs, JNI, and RNI interfaces, respectively. In this embodiment, the Java application is running on a Windows machine. Since Windows applications use dynamically linked libraries (DLLs), the three libraries are DLLs.

Generating a Stubs DLL

In addition to writing and compiling the code for the class (e.g., the MyClass( ) class of FIG. 2), the interface libraries must be generated. The flow diagram of FIG. 3 shows how Stubs, JNI, and RNI DLLs are generated according to one embodiment of the invention.

As shown in FIG. 3, to generate a DLL 306 the C compiler 305 requires three or four inputs, depending on the library to be generated (i.e., depending on the interface to be implemented). For the Stubs interface, four input files are required for each native method to be included in the library: a C header file (".h" file) 303; a stubs file (".c" file) 308; user C code 309; and .h include files 304 such as JDK (Java Development Kit, for the Stubs and JNI interfaces) or SDK (Microsoft Software Development Kit, for the RNI interface) include files.

In this example, a library called MyClassStubs.dll is generated. The MyClassStubs.dll library includes all the functions necessary to enable communication between the Java class MyClass( ) native methods and the code in the DLL. In this simple example, the MyClassStubs.dll library supports only one native method, printNum( ).

In step 302 of FIG. 3, the Javah utility is used to generate C header file 303 from class 301 (e.g., the class MyClass( ) of FIG. 2). FIG. 3 shows three header files 303 because step 302 is also performed when generating JNI and RNI DLLs. The three header files define the function prototypes for the various native methods in the class according to the corresponding native interface. Header file 303 defines the C interface to the DLL.

In step 307 (which is performed only for the Stubs DLL), stubs file 308 is generated from class 301 by running Javah with the "-stubs" option. Stubs file 308 includes an interface layer used by the Sun 1.0 interpreter. Note that the Sun JDK 1.1 version of Javah may be used to produce the files required by the 1.0 interface.

FIG. 4 shows the Javah commands used to produce the header and stubs files for class MyClass( ) targeted to the Stubs interface. The Javah commands in FIG. 4 correspond to steps 302 and 307 of FIG. 3. In this example, the Javah "-o" option is used to give the header file the name "MyClass_stubs.h" and to give the stubs file the name "MyClass_stubs.c".

In a first embodiment (not shown), the function prototypes in the MyClass_stubs.h file are implemented in the user-generated interface code. However, in the first embodiment three different versions of the user-generated interface code must be created, one for each supported interface.

In a second embodiment (e.g., the embodiment shown in FIGS. 3–11), a single C interface (e.g., FIG. 5) is defined and separately targeted to the three supported interfaces. FIG. 6 shows the code targeting the Stubs interface. (FIGS. 5 and 6 together comprise one embodiment of the user C code 309 needed to generate the Stubs DLL for the MyClass( ) class.) FIG. 9 shows the code targeting the JNI interface. FIG. 11 shows the code targeting the RNI interface. As a result of this code segmentation, in this embodiment only one version of the user-generated interface code need be generated. Since this interface code can be quite extensive for some native methods, using a single version of this interface code can significantly reduce coding and debugging time and effort.

In FIG. 5, a C version of the printNum( ) method is shown. Appropriate data types are used. In Java, an "int" (integer) is 32 bits, so in the C code of FIG. 5 a "long" data type is used. Note that the code in FIG. 5 is independent of Java, can be compiled as a stand-alone piece of code, and may also be used to provide a library interface to other C code.

The implemented function in FIG. 5 must now be provided to the C compiler (along with the header, stubs, and include files) in order to generate the Stubs DLL. The code providing the implemented function of FIG. 5 to the compiler is shown in FIG. 6. The code in FIG. 6 is fairly simple and primarily involves casting parameters to their proper data types. Only one return statement, the statement including the printNum( ) function, is included in the exemplary code of FIG. 6. However, in other embodiments, where the class includes two or more native methods, additional C functions must be included in the code to provide the corresponding implemented functions.

Once all necessary files have been generated, the code is compiled into a Stubs DLL using a C compiler (step 305 in FIG. 3). In this example, the Stubs DLL takes the form of a MyClassStubs.dll file that is loaded by the Java code in FIG. 2. Once the Stubs interface has been implemented by generating the Stubs DLL, the class MyClass( ) of FIG. 2 can be executed as shown in FIG. 7, using the Sun 1.0 interpreter.

Generating a JNI DLL

Since the design flow is essentially the same for each DLL, producing subsequent DLLs is relatively easy once the first DLL has been implemented. With the exception of running Javah with the "-stubs" option (step 307) to generate a stubs file (308), the flow diagram in FIG. 3 also applies to the generation of JNI and RNI DLL libraries.

FIG. 8 shows the Javah command used in step 302 of FIG. 3 when generating the JNI header file for class MyClass( ). The code shown in FIG. 8 produces the C header file MyClassJNI.h, which contains the library interface function prototypes expected by the Sun 1.1 interpreter. As when generating the Stubs DLL, these library interface functions must be implemented to produce the DLL. Also as with the Stubs implementation, the user C code is fairly simple. The existing C code in the printNum( ) function of FIG. 5 can also be used in user C code 309 of FIG. 3 to produce a JNI DLL. FIG. 9 shows the user C code providing the implemented function of FIG. 5 to the JNI interface. The C code of FIG. 9 is similar to the corresponding code in FIG. 6. However, the function name and parameters are different, in order to conform to the function prototypes expected by the Sun 1.1 interpreter.

When generating a JNI DLL in this embodiment, the C compilation step (step 305 in FIG. 3) results in the MyClassJNI.dll library. Note that the include files necessary to compile the JNI interface must be the Sun JDK 1.1 include files. The Sun 1.0 JDK include files do not work with the JNI interface. Once the JNI DLL has been generated, the JNI DLL can be loaded by the Java class of FIG. 2. The command executing the MyClass( ) class using the Sun 1.1 interpreter is identical to the Sun 1.0 execution run shown in FIG. 7. If the loadLibrary( ) call for the Stubs DLL is commented out of the Java code in static function 202 of FIG. 2 and only the JNI DLL is loaded, the code executes correctly on a Sun 1.1 interpreter, but fails with a run time "unsatisfied link exception" on a Sun 1.0 interpreter.

Generating a RNI DLL

The last step for this embodiment is to compile a library for the RNI interface. While Microsoft, Inc. has provided its own Java interface (RNI), the RNI interface still uses the same Java source code. Only the way the function prototypes are specified is different. Therefore, the process for generating the RNI DLL is very similar to that for the JNI DLL.

The Microsoft Software Development Kit (SDK) has a header generation program called Msjavah, which is the Microsoft version of Sun's Javah. Msjavah is used to produce the RNI header file that includes the function prototypes for the RNI DLL. The Msjavah command used to generate the RNI header file MyClassRNI.h for class MyClass( ) is shown in FIG. 10. The existing C code in the printNum( ) function of FIG. 5 can also be used in user C code 309 of FIG. 3 to produce an RNI DLL. The user C code providing the implemented function of FIG. 5 to the RNI interface is shown in FIG. 11.

From these files, an RNI DLL is compiled. As with the JNI interface, the correct include files from the SDK must be used. The JDK include files cannot be used to compile an RNI library. The compiled DLL MyClassRNI.dll can be loaded and executed by the Java code. Once the RNI DLL is available, the Microsoft Java interpreter is supported by the class MyClass( ).

A method for generating interface software compatible with two or more different interpreters has been described. The techniques described herein permit Java developers to produce and ship portable code using native methods. However, those having skill in the relevant arts of the invention will now perceive various modifications and additions which may be made as a result of the disclosure herein. For example, the method of the invention can be applied to code written in object-oriented languages other than Java. The user code can be implemented in languages other than C. Interfaces other than or in addition to the Stubs, JNI, and RNI interfaces can be supported. Accordingly, all such modifications and additions are deemed to be within the scope of the invention, which is to be limited only by the appended claims and their equivalents.

What is claimed is:

1. A data storage medium comprising a software class supporting a plurality of interfaces, the class comprising:
   a first computer code device defining a native method for communicating with one of hardware and code; and
   a second computer code device for loading a first library and a second library, wherein:
   the first library implements the native method and is compatible with a first interpreter, and
   the second library implements the native method and is compatible with a second interpreter.

2. The data storage medium of claim 1, further comprising a third computer code device calling the native method.

3. The data storage medium of claim 1, wherein the first and second libraries are generated using shared user code that implements the native method.

4. The data storage medium of claim 3, wherein the shared computer code is implemented in C.

5. The data storage medium of claim 1, wherein the class is written in JAVA code.

6. The data storage medium of claim 5, wherein:
   the second computer code device further loads a third library implementing the native method;
   the first library is compatible with the SUN 1.0 interpreter;
   the second library is compatible with the SUN 1.1 interpreter; and
   the third library is compatible with the MICROSOFT JAVA interpreter.

7. The data storage medium of claim 5, wherein the first and second libraries are generated using shared computer code that can be targeted to two or more different interfaces.

8. The data storage medium of claim 7, wherein the shared computer code is implemented in C.

9. A method for generating a software class supporting a plurality of interfaces, the method comprising the steps of:

a) defining a native method;

b) loading a first library that implements the native method and is compatible with a first interpreter; and c) loading a second library that implements the native method and is compatible with a second interpreter.

10. The method of claim 9, further comprising the step of adding a main method calling the native method.

11. The method of claim 9, wherein the first and second libraries are generated using shared user code that implements the native method.

12. The method of claim 11, wherein the shared computer code is implemented in C.

13. The method of claim 9, wherein the class is written in JAVA code.

14. The method of claim 13, further comprising the step of loading a third library that implements the native method; wherein:

the first library is compatible with the SUN 1.0 interpreter;

the second library is compatible with the SUN 1.1 interpreter; and the third library is compatible with the MICROSOFT JAVA interpreter.

15. The method of claim 13, wherein the first and second libraries are generated using shared computer code that can be targeted to two or more different interfaces.

16. The method of claim 15, wherein the shared computer code is implemented in C.

* * * * *